Figure 1:
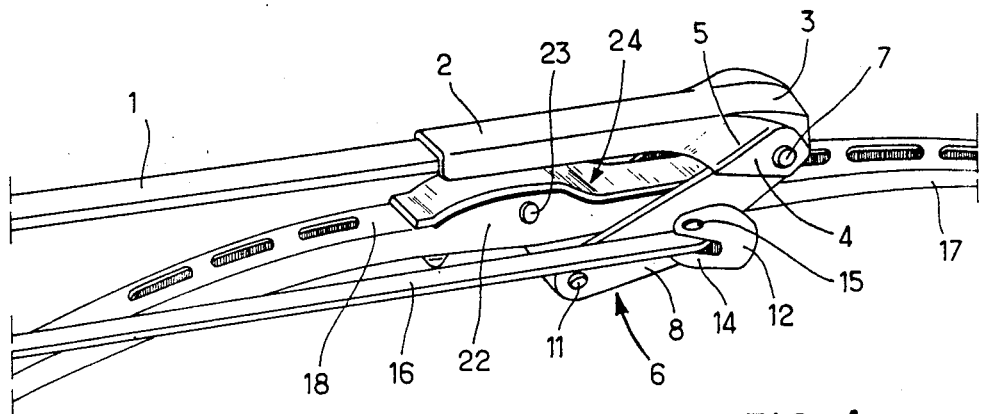

United States Patent [19]

Wattier

[11] Patent Number: 4,622,711
[45] Date of Patent: Nov. 18, 1986

[54] ROCKER ARM WINDSCREEN WIPER SYSTEM MOUNTED ON A BLADE BY MEANS OF AN ADAPTER

[75] Inventor: Maurice F. Wattier, Sissonnes, France

[73] Assignee: Equipements Automobiles Marchall, Issy-les-Moulineaux, France

[21] Appl. No.: 637,214
[22] PCT Filed: Nov. 30, 1983
[86] PCT No.: PCT/FR83/00240
 § 371 Date: Jul. 17, 1984
 § 102(e) Date: Jul. 17, 1984
[87] PCT Pub. No.: WO84/02313
 PCT Pub. Date: Jun. 21, 1984

[30] Foreign Application Priority Data
 Dec. 10, 1982 [FR] France .................................. 82 20757

[51] Int. Cl.⁴ ................................................ B60S 1/40
[52] U.S. Cl. .............................. 15/250.23; 15/250.35; 15/250.42; 15/250.32

[58] Field of Search ........... 15/250.21, 250.23, 250.35, 15/250.42, 250.32

[56] References Cited
FOREIGN PATENT DOCUMENTS
890467 3/1982 France .............................. 15/250.21

Primary Examiner—Peter Feldman
Attorney, Agent, or Firm—Brisebois & Kruger

[57] ABSTRACT

In accordance with the invention, the armature (17) of the windscreen wiper blade is caused to rotate in an alternating manner by a blade support arm (1) by means of a rocker arm (6) articulated on the arm (1) and on a rocker arm control member (16) which is displaced with respect to the arm (1). The armature (17) is connected to the rocker arm (6) by means of an adapter (24) which is mounted in a detachable manner on the armature (17) by resilient locking and on which the rocker arm (6) is pivotably mounted about an axis of rotation (11) disposed below the armature (17) with respect to the pivoting axis (7) of the rocker arm (6) on the arm (1). To be used to equip automobile vehicles.

17 Claims, 6 Drawing Figures

ROCKER ARM WINDSCREEN WIPER SYSTEM MOUNTED ON A BLADE BY MEANS OF AN ADAPTER

The present invention relates to windscreen wiper systems designed for vehicles, in particular road vehicles, which comprise a rocker or tilter arm enabling any one of the points of the blade(s) which are associated therewith in a system of this type to be provided with a non-circular path which is designed to improve visibility and cleaning quality with respect to conventional windscreen wiper systems having a circular path.

The windscreen wiper blades which are used with these systems are generally constituted by a scraper blade comprising a wiper lip made of elastomer which is designed to come into contact with a surface to be cleaned such as a windscreen. This scraper blade is either mounted solely by means of an armature articulated at one end of a windscreen wiper arm which is pivotably mounted at its other end on the vehicle, or connected to an armature of this type by means of rocking levers which are themselves articulated below the armature.

The Belgian Patent Specification No. 890 467 discloses a windscreen wiper system of this type, in which a blade is mounted in a detachable manner by means of its armature on a rocker or tilter arm which is itself, on one hand, mounted pivotably about a first axis on the blade support arm which is caused to rotate in an alternating manner and, on the other hand, articulated on a rocker arm control member, which control member is displaced with respect to the blade support arm, during the alternating rotation of the latter, such that the rocker arm pivots with respect to the blade support arm and the path of any one of the points of the blade is non-circular.

The present invention proposes to improve the windscreen wiper systems of the type described above. The invention relates to a windscreen wiper system of the type mentioned above, whose construction enables the dimensions of the system at the connection of the rocker arm to the two arms and the blade to be limited so as not to hinder the visibility of the driver.

For this purpose, the windscreen wiper system of the invention, of the type described above, is characterised in that the armature of the blade is connected to the rocker arm by means of an adapter on which the rocker arm is mounted to pivot about an axis of rotation located on the side of the web of the armature on which the surface to be cleaned is located. It should be noted that the axis of rotation (rocker arm/adapter) may or may not be embodied in the form of a hinge member. If this is not the case, it may be positioned to infinity in which case the relative rocker arm/adapter movement becomes a translation.

The adapter is advantageously mounted in a detachable manner on the armature by resilient locking. An embodiment of this type has the advantage that, in order to replace a blade, it is simply necessary to unlock the adapter from the blade in position in a resilient manner so as to be able to remove the latter without having to dismantle any articulations and without having to modify the assembly of the blade support arm and the rocker arm control member with the rocker arm. Positioning of a new blade may be carried out in a simple manner by positioning it on the adapter and resiliently locking the adapter on the armature of the blade.

The rocker arm is preferably mounted to pivot about a second axis on the adapter, which axis is parallel to the first axis providing the (rocker arm/blade support arm) articulation, which, on one hand, facilitates the displacements of the blade with respect to the blade support arm, when the rocker arm is pivoted on the latter, and, on the other hand, ensures an improved entrainment of the blade by the blade support arm during the alternating rotations of the latter, as well as a correct retention of the blade armature in a plane passing through the blade support arm and perpendicular to the windscreen, which ensures a good cleaning quality.

The articulation of the rocker arm on the rocker arm control member is advantageously located substantially between the first and the second axis. It is provided by two rotary connections, one of which takes place about a third axis parallel to the first, the other preferably being perpendicular to the third. This has the advantage that the blade and the blade support arm are not subject to transverse efforts during the displacements of the control member with respect to the rocker arm, and that the dimensions of the system at the connection of the rocker arm to the two members and to the blade are limited so as not to impair the visibility of the driver.

In order to facilitate the positioning of the adapter on the blade and to provide a more accurate fastening position of the adapter on the blade, the armature of the blade is provided with a support spindle which is housed in a recess of the adapter and about which the latter pivots during its mounted on the armature. In this case, in order to ensure the simultaneous resilient retention and guiding of the adapter during its positioning on the armature, the recess of the adapter is advantageously bounded by a component having a U-shaped cross-section whose two limbs enclose the support spindle.

In a preferred embodiment, which enables the use of blades whose armature has a cross-section in the shape of a U, whose web has an aperture on both sides of the support spindle, the adapter has a component which is resiliently locked on at least a first edge of the aperture. In this case, at least a second edge of the aperture, in particular an edge opposite to the first on the periphery of this aperture, is advantageously inserted in a further portion of the adapter which therefore straddles the said edge. In this way, the adapter may be suitably locked with the armature of the blade, without projecting to too great an extent from the aperture provided in the armature.

In a particular embodiment, the recess of the adapter is bounded between, on one hand, a tongue connecting the portion of the adapter which is resiliently locked with a first edge of the aperture of the armature to the other portion of the adapter straddling a second edge of the aperture and, on the other hand, a solid portion of the adapter, on which there is mounted the rocker arm, which enables the adapter to be readily positioned on the armature by the insertion of the spindle support for the latter in the recess disposed substantially perpendicularly to the armature, and then by tilting the adapter about the support axis and resiliently locking the portion(s) of the adapter provided for this purpose on the corresponding edge(s) of the aperture.

In order to facilitate dismantling, the adapter is preferably provided with an unlocking lug disposed below the armature of the blade when the adapter is fixed on the blade.

In an embodiment which is very simple from a mechanical point of view, the rocker arm is pivotably mounted on the adapter by means of the engagement of two journals which are coaxial and two coaxial recesses each of which is designed to receive one of the journals. In this case, one of the two journals may be orienated towards the other, for example, and supported by the rocker arm, and the two corresponding coaxial recesses are each provided in one of the lateral faces of the solid portion of the adapter, a groove which opens onto one of the faces of this solid portion communicating in a substantially radial manner with each of the coaxial recesses, such that each of the two journals of the rocker arm may slide into one of the two grooves and therefore be inserted into the corresponding recess of the adapter, before the fastening of the latter to the armature. After the assembly of the adapter on the armature, the journals of the rocker arm cannot be released from the adapter, as the faces in which the grooves are provided are then partially covered by the flanges of the armature.

However, it is also possible, in accordance with a variant of the invention, for the adapter to have at least one lateral guideway on which the rocker arm slides, the guideway being shaped as the arc of a circle with its concave portion facing the surface to be cleaned being rectilinear if the axis of rotation of the rocker arm with respect to the adapter is extended to infinity below the armature. In this variant the axis of rotation (rocker arm/adapter) is not therefore embodied.

Figure 3:
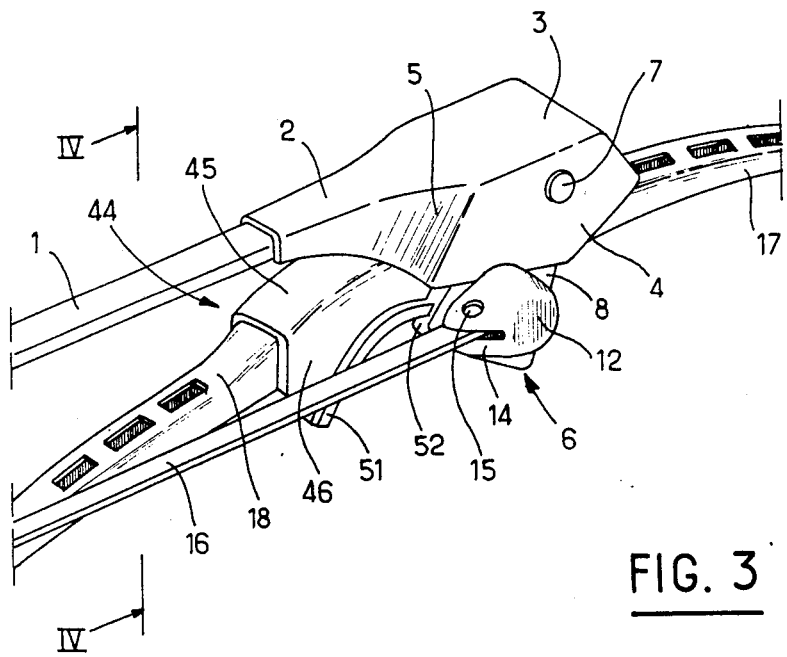
Figure 2:
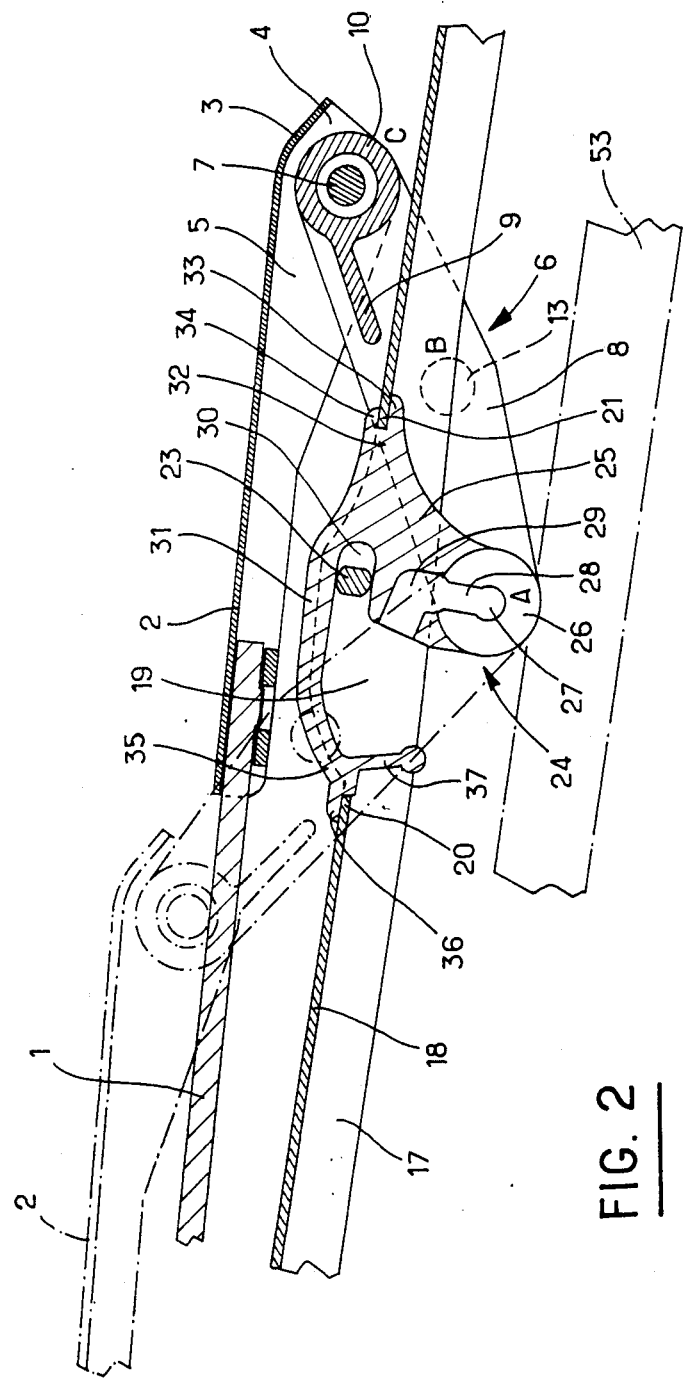
Figure 4:
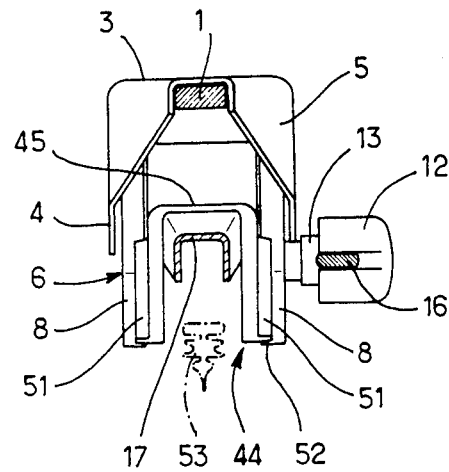
Figure 5:
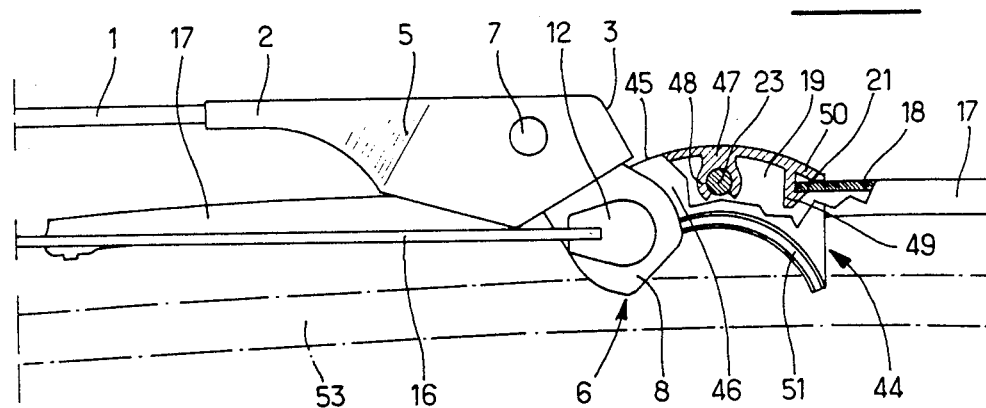
Figure 6:
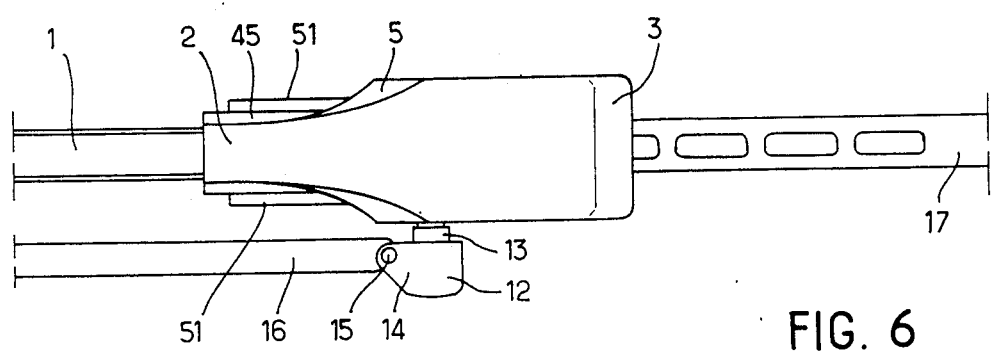

The invention is now described in further detail with reference to two embodiments, given purely by way of non-limiting example, with reference to the attached drawings, in which:

FIG. 1 is a partial perspective view of a first embodiment of the windscreen wiper system of the invention, FIG. 2 is an axial section through the system of FIG. 1, FIG. 3 is a similar view of FIG. 1 of a second embodiment, with the blade disposed in an extreme angular position with respect to the blade support arm, FIG. 4 is a transverse section along the line IV—IV of FIG. 3, FIG. 5 is a lateral elevation, with some components removed, of the system shown in FIG. 3, with the blade in the other extreme angular position with respect to the blade support arm, FIG. 6 is a plan view of the system shown in FIG. 3.

With reference to FIGS. 1 and 2, it can be seen that the windscreen wiper system comprises a blade support arm 1 which is caused to rotate in an alternating manner via one of its ends on the vehicle. The other end of the arm 1 is fixed in a connector 2 having a U-shaped cross-section covering the corresponding end portion of the arm 1. The connector 2 is widened at its end 3 opposite to its area of connection with the arm 1, such that the flanges 4 of the U-shaped cross-section of the widened end 3 form a hinge fork for one end of a rocker arm 6. The flanges 4 are connected to the flanges of the U-shaped cross-section of the remainder of the connector 2 by walls 5 which are inclined with respect to the longitudinal axis of the connector 2 which merges with that of the arm 1.

The rocker arm 6 is constituted by two lateral flanks 8 having the same shape which are connected together by a plane transverse strut 9 rigid with a transverse cylindrical sleeve 10. The strut 9 and the sleeve 10 are both disposed between two of the corresponding ends of the flanks 8 so as to form the end of the rocker arm 6 by means of which the latter is pivotably mounted in the widened end 3 of the connector 2 about the axis 7 which passes through the sleeve 10.

The opposite ends of the flanks 8 each support one of the two coaxial journals 11, which are orientated one towards the other between the two flanks 8 and parallel to the axis 7. In addition, in the central portion of one of the flanks 8, a dog 12 is rotatably mounted on the external face of this flank 8 about an axis 13 parallel to the axis 7. This dog 12 forms a fork 14 between the two limbs of which one end of a second arm 16 is pivotably mounted about an axis 15 perpendicular to the axis 13.

The other end (not shown) of the second arm 16 is either articulated about a transmission, or connected to a fixed point of the vehicle, in a known manner, such that, during the alternating rotations of the arm 1, the second arm 16 is displaced with respect to the arm 1 in such a way that it controls the alternating pivot movements of the rocker arm 6 about the axis 7 on the end of the arm 1, providing the windscreen wiper blade with a non-circular path.

The armature 17 or blade holder of the windscreen wiper blade is pivotably mounted about the journals 11 of the rocker arm 6 by means of an adapter 24 which is described in detail below. The armature 17 is constructed in a known manner, and has a U-shaped transverse section which opens from the side opposite to the blade support arm 1 and a slightly curved shape, the concave portion of which faces away from the side opposite to the blade support arm 1. The armature 17 has, in a central portion of the web 18 of the U, an aperture 19 bounded by two transverse edges 20 and 21 and by two lateral flanges 22 between which a spindle support 23 is mounted parallel to the axis 7.

The adapter 24 is a moulded plastics component which comprises, as shown in FIG. 2, a solid portion 25, of which a partially cylindrical portion has circular lateral bearings 26, in the centre of which there are provided circular bores 27, which are coaxial and blind. A groove 28 provided in the corresponding face 26 communicates radially with each of the bores 27, which groove extends into the corresponding end face of the solid portion 25 via an elbow groove 29, which opens in a border of the body 25 adjacent to a further border of this body 25 which defines, with the face opposite a tongue 31, a elongate recess 30 having a longitudinal U-shaped section. The tongue 31 is connected to the solid portion 25 and to a portion 32 having a forked end. It comprises a resilient locking end 35 designed to engage with the transverse edge 20 of the aperture 19 of the anmature 17.

The two limbs 33 and 34 of the portion 32 having a forked end have different lengths, and the limb 33, an external surface of which is connected to that of the body 25, is longer than the limb 34, whose external surface is connected to the tongue 31. A reflex angle is cut into the end 36 of the portion 35, enabling this portion 35 to be resiliently supported by its end 36 against the edge 20 of the aperture 19, after the spindle support 23 has been inserted in the recess 30 and the portion 32 having a forked end has been placed astride the other transverse edge 21 of the aperture 19, as explained below. The portion 35 has, in addition, an unlocking lug 37 orientated from the side of the tongue 31 at which the solid portion 25 is located.

When the blade support arm 1, the rocker arm 6 and the rocker arm control member 16 have been assembled in the normal way, the assembly of the rocker arm 6 on the adapter 24 is carried out as follows: the rocker arm 6 and the adapter 24 are disposed with respect to one another such that the journals 11 of the rocker arm 6 each face the opening of the corresponding lateral groove 29, and these are then guided in the grooves 29 and 28 until they are housed in the coaxial bores 27, so as to ensure the pivotable mounting of the rocker arm 6 on the adapter 24. The adapter 24 is then placed, with its tongue 31 upwardly and substantially vertically orientated, below the armature 27 and inserted into the aperture 19, between the lateral flanges 22 bordering the latter, such that the spindle support 23 is guided up to the end of the recess 30. The adapter 24 is than tilted around the spindle support 23 until the limb 33 of the portion 32 having a forked end abuts against the edge 21 of the aperture 19. The adapter 24 is then slightly displaced (towards the right-hand side of FIG. 2), such that the portion 32 having a forked end straddles the edge 21. The portion 35 is folded down in a resilient manner, thanks in particular to the flexibility of the tongue 31, in the direction of the edge 20, against which this portion 35 is supported in a resilient manner via the reflex angle cut into its end 36. The portion 35 is therefore applied on one side against the upper face of the edge 20 and on the other side against the face of the edge 20 facing the interior of the aperture 19, the resilient unlocking lug 37 passing through the aperture 19 and being protected against any undesirable unlocking movement by the two flanges of the U-shaped structure of the armature 17, between which the lug 37 is housed.

In order to resiliently unlock the adapter 24, it is simply necessary to press on the lug 37 wth a finger in the direction of the spindle support 23, which releases the portion 35 from the edge 20 of the aperture. It is then possible to release the edge 21 by displacing the adapter 24 (towards the left-hand side of FIG. 2) and finally to tilt the adapter 24 about the support spindle 23 in the direction opposite to the direction of mounting, so as to release it from the aperture 19 by passing it below the armature 17.

In FIG. 2, the first extreme angular position of the rocker arm 6 is shown in continuous lines and the second extreme position is shown in dashed lines.

It can be seen therefore that the blade may be replaced readily by a few very simple manoeuvres.

It can also be seen that the positioning of the pivot axis of the rocker arm 6 on the adapter 24 below the armature 17 is advantageous for the anti-lift properties of the windscreen wiper during use at high vehicle speeds.

The second embodiment, shown in FIGS. 3 to 6, has a number of points in common with the embodiment described with reference to FIGS. 1 and 2, and identical or very similar components have been given the same reference numerals.

In particular, the assembly of the blade support arm 1 and the rocker arm control member 16 on the rocker arm 6 are identical.

The essential difference lies in the construction, the assembly and the method of engagement of the adapter 44 with, on one hand, the rocker arm 6 and, on the other hand, the armature 17 of the blade.

The adapter 44 has, in this embodiment, a U-shape facing in the same direction as the U-shape of the armature 17 or blade holder. It comprises a curved web 45 covering the central portion of the armature 17, which is provided with the aperture 19, and the flanges 46 of the adapter 44 also cover the outer faces of the flanges of the armature 17. The adapter 44 therefore straddles the armature 17 and is fixed on the latter by engagement above the armature 17. The web 45 supports, between the flanges 46, a transverse portion 47 having a U-shaped cross-section whose resilient limbs 48 are resiliently locked around the transverse support spindle 23 mounted in the flanges which border the aperture 19 in a lateral manner. In addition, resilient hooks 49, fixed to the ends of the inner face of the web 45 of the adapter 44 are resiliently locked below the transverse edges 20, 21 of the aperture 19, each of these edges thus being clamped between the hook 49 and the corresponding edge 50 of the web 45. This adapter 44 may also be provided with an unlocking lug whichis advantageously located as an extension to one of the hooks 49.

At the lower end of each of its flanges 46, the adapter 44 is provided with a guideway 51 in the form of the arc of a circle the concave portion of which faces in the same direction as that of the web 45, i.e. away from the armature 17. This guideway 51 projects outwardly with respect to the corresponding flange 46 and each of the two flanks 8 of the rocker arm 6 has, in its inner face, a notch in the shape of an arc of a circle having the same radius as the guideways 51, and whose lower edge 52 is folded towards the interior of the corresponding guideway 51 passing under the lower end of the latter, such that each of the flanks 8 may slide along the corresponding guideway 51 whilst being retained thereupon.

When the rocker arm control member 16 is displaced with respect to the blade support arm 1, the rocker arm 6 slides by means of its flanks 8 along the guideways 51 of the adapter 44, from a first extreme angular position shown in FIG. 3 to a second extreme angular position shown in FIG. 5.

FIGS. 2, 4, and 5 show, in diagrammatic form, the wiping lip 53 connected to the armature 17 by rocking levers (not shown). The low vertical dimensions of the systems of the invention, despite the presence of the rocker arm 6 and the adapter 24 or 44, should be noted.

It should also be noted that the axis of rotation of the rocker arm 6 with respect to the adapter 44, which corresponds to the axis of the circular arcs of the guideways 51 may be located below the windscreen. It may also be extended to infinity below the armature 17. The guideway 51 then becomes rectilinear, which constitutes a further embodiment of the invention.

It should be understood that the systems described above may be modified in any desirable way without departing from the scope of the invention.

What is claimed is:

1. Windscreen wiper system for a vehicle, in which at least one wiper arm is adapted to be oscillated with respect to a surface of a windscreen to be cleaned, a rocker arm is pivotally mounted on the wiper arm, a rocker arm control member is pivotally connected to the rocker arm and is adapted to be displaced with respect to the wiper arm during oscillation of the wiper arm, to cause the rocker arm to pivot to provide a non-circular wiping path for a wiper blade mounted on a blade holder connected to and moveable by the rocker arm, said system comprising, means mounting the rocker arm for pivotal movement about a first axis on the wiper arm, means pivotally connecting the rocker arm to said control member for pivotal movement about a second axis spaced from the first axis, a wiper blade holder, and adapter means connected to said blade holder for pivotally connecting said rocker arm to the blade holder for pivotal movement with respect to the blade holder about a third axis inwardly of the blade holder on the side of the blade holder on which the surface to be cleaned is located.

2. A windscreen wiper system as claimed in claim 1 wherein the adapter means is detachably mounted on the blade holder by a resilient lock.

3. A windscreen wiper system as claimed in claim 1 wherein the rocker arm is pivotably mounted on the adapter means by a pivot axle parallel to the first axis.

4. A windscreen wiper system as claimed in claim 3 wherein the second axis which connects the rocker arm to the control member is located substantially between the first axis and the third axis.

5. A windscreen wiper system as claimed in claim 3 wherein said means pivotally connecting the rocker arm to the control member comprises a first rotary connection, and a second rotary connection, said first connection pivoting about said second axis, and being parallel to the first axis.

6. A windscreen wiper system as claimed in claim 5 wherein said second rotary connection comprises an axis of rotation perpendicular to the second axis.

7. A windscreen wiper system as claimed in claim 6 wherein the blade holder carries a support spindle which seats in a recess of the adapter means and around which the adaptor pivots during mounting on the blade holder.

8. A windscreen wiper system as claimed in claim 7 wherein the recess of the adapter means is bounded by a portion having a U-shaped cross-section with two legs which extend around the support spindle.

9. A windscreen wiper system as claimed in claim 8 wherein the blade holder is of U-shaped cross section with a web having an aperture on both sides of the support spindle, and wherein the adapter means comprises resilient lock means for resiliently locking the adapter means on at least a first edge of the aperture.

10. A windscreen wiper system as claimed in claim 9 wherein said adapter means further comprises recess means to receive a second edge of the aperture so that the adapter straddles said second edge.

11. A windscreen wiper system as claimed in claim 10 wherein said recess means of the adapter means is bounded by, a tongue connecting the resilient lock means at the first edge of the aperture to the portion having the recess and which straddles the second edge of the aperture, and a solid body portion of the adapter means on which the rocker arm is pivotally mounted.

12. A windscreen wiper system as claimed in claim 9 wherein the adapter means has an unlocking lug disposed below the blade holder, when the adapter means is fixed on the bladeholder.

13. A windscreen wiper system as claimed in claim 12 wherein the rocker arm is pivotally mounted on the adapter means by the engagement of two coaxial journals in two corresponding coaxial recesses.

14. A windscreen wiper system as claimed in claim 13, wherein the two journals are oriented towards one another and supported by the rocker arm, and the two corresponding coaxial recesses are inside faces of the solid body portion of the adapter means, said body portion having grooves which open through a face of the body and extend from the coaxial recesses, so that the two journals of the rocker arm can be guided through the two grooves into the recess of the adapter means before fastening the adaptor on the bladeholder.

15. A windscreen wiper system as claimed in claim 1 wherein the adapter means has at least one lateral guideway on which the rocker arm slides.

16. A windscreen wiper system as claimed in claim 15 wherein the guideway has the shape of an arc of a circle, whose concave portion faces toward the surface to be wiped.

17. A windscreen wiper system as claimed in claim 16 wherein the lateral guideway of the adapter means is rectilinear.

* * * * *